United States Patent
Shiban

[19]

[11] Patent Number: 6,030,585
[45] Date of Patent: Feb. 29, 2000

[54] APPARATUS FOR OXIDIZING AND REMOVING MATTER FROM A HAZARDOUS GAS FLOW

[75] Inventor: Samir S. Shiban, Chandler, Ariz.

[73] Assignee: Innovative Engineering Solutions, Inc., Chandler, Ariz.

[21] Appl. No.: 09/050,173

[22] Filed: Mar. 30, 1998

[51] Int. Cl.⁷ .......................... B01D 53/34; B01D 45/08
[52] U.S. Cl. ...................... 422/168; 422/169; 422/171; 422/182; 422/228; 55/413; 55/427; 55/436; 55/439; 55/446; 55/465
[58] Field of Search .................... 422/168–172, 422/182, 224, 228, 210; 15/104.16; 55/413, 427, 436, 439, 446, 465, 463

[56] References Cited

U.S. PATENT DOCUMENTS

| | | | |
|---|---|---|---|
| 5,271,908 | 12/1993 | Shiban et al. | 422/228 |
| 5,353,829 | 10/1994 | Shiban | 137/88 |
| 5,662,722 | 9/1997 | Shiban | 55/413 |
| 5,699,826 | 12/1997 | Shiban | 137/244 |

*Primary Examiner*—Hien Tran
*Attorney, Agent, or Firm*—James D. Givnan

[57] ABSTRACT

An apparatus includes a housing into which a hazardous gas is introduced. A sleeve in the housing includes a perforate segment into which the gas is discharged along with flows of oxygen delivered from sleeve mounted nozzles. Particles forming in a sleeve defined mixing zone gravitate toward a first collection site within the housing. Within the housing are radially spaced tubular members through which the gas and oxygen mixture flows in a serpentine path with provision for the collection of particles precipitating from the flow adjacent one end of the housing. Metallic fibers render any gas collection in the housing inert. Provision is made for delivering, in the alternative, a pressurized air flow to the sleeve for oxidizing the hazardous gas flow utilizing ambient air. A diffuser plate imparts current to the ambient air discharged into the sleeve.

10 Claims, 1 Drawing Sheet

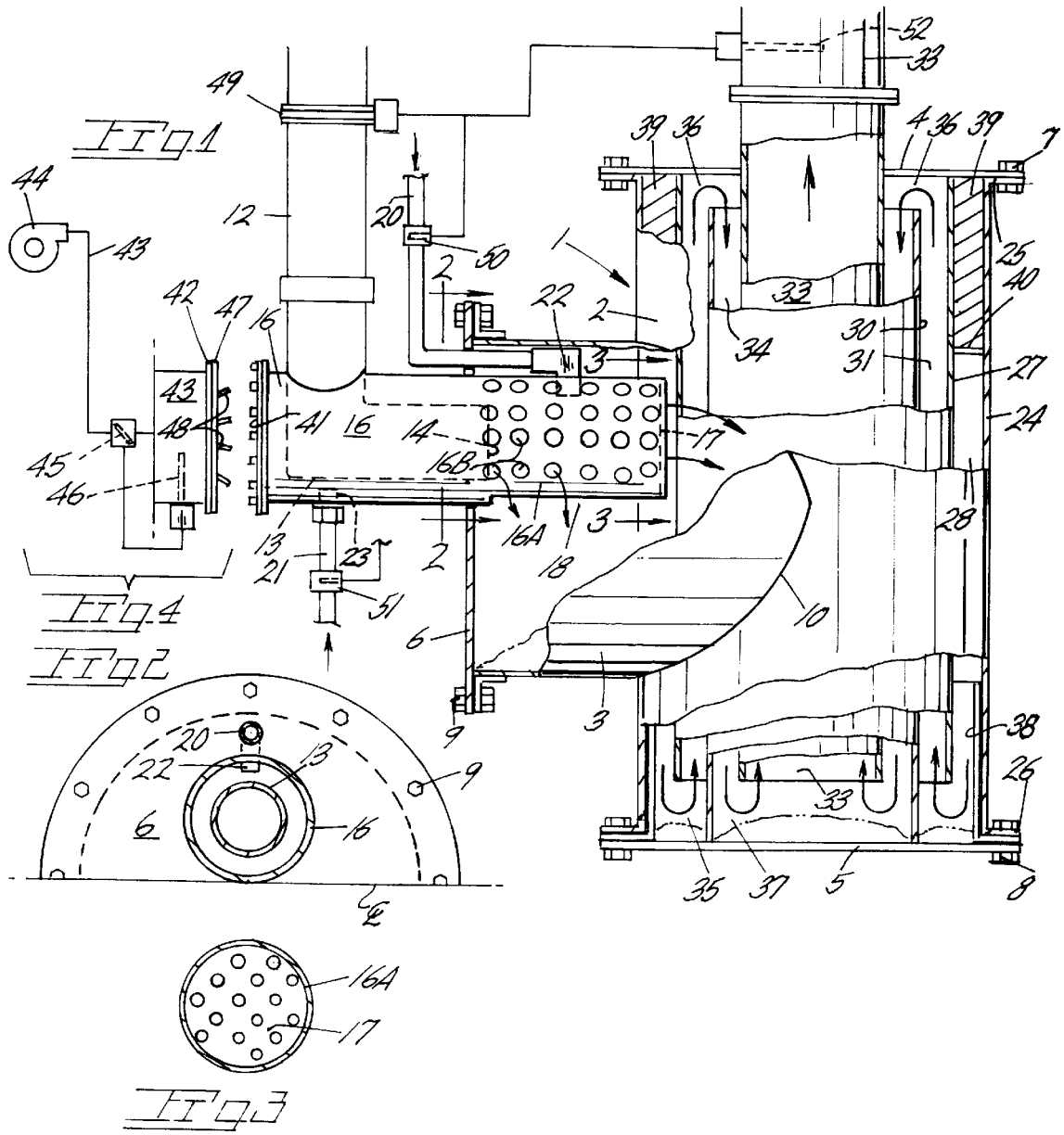

APPARATUS FOR OXIDIZING AND REMOVING MATTER FROM A HAZARDOUS GAS FLOW

BACKGROUND OF THE INVENTION

The present invention pertains to equipment for removing hazardous matter from a gas flow to the extent the flow may be released to the atmosphere in accordance with applicable environmental requirements.

In the manufacture of certain components such as microchips, a byproduct in the form of a hazardous gas is produced which must be reduced to an inert state before venting to the atmosphere. One such gas is silane which occurs in semiconductor, photovoltaic and flat panel manufacturing processes. It has been determined that the infusion of oxygen into a silane gas flow results in the formation and precipitation of deposits to the extent the remaining flow is suitable for exhaust to the atmosphere. An apparatus for combining oxygen and silane gas is disclosed in a co-pending U.S. patent application of the present inventor.

SUMMARY OF THE PRESENT INVENTION

The present invention includes an apparatus in which oxygen and a hazardous gas may be mixed with resulting matter being collected in multiple zones of the apparatus which are readily accessible for removal of the matter.

The apparatus includes a perforate sleeve disposed about the discharge end of a hazardous gas conduit with oxygen injected into the sleeve and into a mixing chamber for the gas and oxygen. Provision is made for the discharge of particles formed at this mixing site with collection of the particles being adjacent a removal plate facilitating particle removal. The flow of the mixed gas and oxygen is thereafter introduced into multiple concentric tubes of a separator through which the oxygen and hazardous gas flow in a serpentine manner resulting in still further particulates being deposited in a second zone adjacent an access plate permitting convenient particle removal. Separation of particulate from the mixed flow occurs during deceleration and redirection of flows adjacent housing ends permitting convenient removal with a minimum of down time and interference with a production operation. While in the preferred form of the invention provision is made for the infusion of oxygen into the present apparatus, the apparatus may be readily converted to the use of ambient air for mixing with the hazardous gas and which incurs only a slight alteration of the apparatus.

Important objectives of the present apparatus is the provision of an apparatus of a design permitting the efficient removal of hazardous particles from a gas flow by the infusion of oxygen into the gas flow with multiple zones provided in the apparatus for collection and subsequent removal of particulate; the provision of an apparatus for mixing oxygen with a hazardous gas with apparatus components being substantially of tubular configuration to greatly reduce cost of manufacturing of the apparatus; the provision of an apparatus for treating hazardous gas which may utilize a flow of oxygen for mixing with the hazardous gas or, alternatively, utilizing a flow of ambient air for such a purpose with minimun alteration effort; the provision of an apparatus utilizing concentric, reverse flow passageways to contribute to separation of particulate from a flow of a mixed hazardous gas and oxygen.

BRIEF DESCRIPTION OF THE DRAWINGS

In the drawings:

FIG. 1 is a front elevational view of the present apparatus with the parts broken away for purposes of illustration;

FIG. 2 is a vertical sectional view taken along line 2—2 of FIG. 1;

FIG. 3 is a vertical sectional view taken along line 3—3 of FIG. 1; and

FIG. 4 is a schematic view of alternative components of the apparatus.

DETAILED DESCRIPTION OF THE PREFERRED EMBODIMENTS

With continuing attention to the drawings wherein applied reference numerals indicate parts similarly hereinafter identified, the reference numeral 1 indicates a housing of the apparatus including a cylinder 2 having a branch or lateral extension 3. Cylinder 2 and extension 3 are closed by end plates as at 4, 5 and 6 suitably secured in place by fastener assemblies as at 7, 8 and 9. Lateral extension 3 merges with cylinder 2 along a welded seam 10.

A gas line 12 carries a hazardous gas such as silane from a manufacturing operation to the apparatus and terminates in a discharge end segment 13 having an outlet end 14. A sleeve at 16 receives gas line 12 and houses discharge end segment 13, the latter in a concentric manner. The sleeve projects beyond outlet end 14 of conduit or segment or outlet 13 with a sleeve perforate segment at 16A. An apertured end plate 17 is in place with the end of segment 16A. A cut-out area 18 of the sleeve permits discharge of matter resulting from the following described mixing of oxygen and the hazardous gas discharged from gas line 12. For the discharge of oxygen into sleeve 16, oxygen lines at 20 and 21, in upstream communication with a source, terminate within the sleeve in nozzles at 22 and 23. Apertures at 168 in sleeve 16 prevent the formation of gas bubbles and promote mixing of oxygen with the gas being treated. Matter precipitates from sleeve segment 16A downwardly through opening area or cut-out area 18 and enters a first collection zone defined by plate 6 and laterally directed housing extension 3.

With attention to housing 2, the same is preferably cylindrical as is its lateral extension 3. Housing 2 includes a first or outer cylinder 24 flanged at 25 and 26 for securement to plates 4 and 5. A series of fasteners are at 7. Depending from plate 4 is a second cylinder 27 which, along with cylinder 24, defines an annular open area or passageway 28. A 20 third cylinder 30 carried by plate 5 terminates upwardly proximate plate 4 and defines, along with cylinder 27, a second annular area or passageway 31. An exhaust conduit 33 defines, along with cylinder 30, an annular space or passageway 34. Those areas 35, 36 and 37 may be termed flow reversal areas. Areas 35 and 37 immediately above plate 5 constitute a second collection zone wherein particles precipitating from the serpentine flow of the mixed oxygen and hazardous gas collect prior to entering exhaust flow in pipe 33. Both the first collection zone and second collection zone may be periodically accessed for cleaning by removal of plates 6 and 5 without further disassembly of the apparatus. To facilitate cleaning of the apparatus, a collar 38 secured as by a weld to end plate 5, is removable with the end plate upon removal of fasteners 8 and serves to confine deposits during transfer to a discharge site.

To prevent the pocketing of a hazardous gas in the upper end of the apparatus an area at 39 is preferably packed with a non-combustible filler such as steel wool or sand. A ring 40 in place on the interior of the outer cylinder 24 confines the filler in place.

Provision is made for the alternative use of atmospheric or ambient air for mixing with hazardous gas delivered by conduit or gas line 12. A closure on the exposed end of sleeve 16 may be removed to permit replacement by installation of the flanged end 42 of an air conduit 43 in communication with an airflow provided by a source such as a fan 44. A damper 45 provides a control for air delivered through conduit 43 into sleeve 16. A flow sensor at 46 is in circuit with a servo mechanism controlling the position of damper 45. Preferably a diffuser plate 47 is interposed between coupled flanges 41 and 42 to impart diverging current flows to ambient air entering sleeve 16. Diffusing louvers are at 48. During use of the alternative use of air in the present system, oxygen flow is, of course, terminated by closure of valves (not shown) in lines 20 and 21. A temperature sensor 52 in outlet 33 serves to terminate the entry of hazardous gas via conduit 12 by actuating a gate valve 49 in the event of a temperature drop below acceptable levels in the outlet.

During operation of the present apparatus using oxygen, flow meters at 50 and 51, upon detecting inadequate flows in oxygen lines 20 or 21, may also act to close gate valve 49.

It will be noted that the lengthwise axis of sleeve 16 is offset upwardly from the axis of housing branch 3 and thereby enables said first collection zone to be of increased area to lessen the frequency of particle removal. Further, the risk of gas collection in the upper portion of branch 3 is minimized.

U.S. Pat. No. 5,699,826 issued to the present inventor discloses a rake for dislodging deposits from the interior of a hazardous gas inlet conduit and is incorporated herein by reference.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. An apparatus for oxidizing and removing matter from a flow of hazardous gas and comprising, a housing having an upright main member, a hazardous gas conduit having a discharge end segment in communication with said housing, a sleeve in place about a portion of said conduit and said discharge end segment thereof and including a perforate segment extending into the housing and into which hazardous gas is discharged, means for discharging oxygen into said sleeve for mixing with the hazardous gas in a reaction zone within said perforate segment, a first collection zone in said housing for reception of oxidized particles from said perforate segment of said sleeve, tubular members radially spaced from one another in said upright main member of said housing and constraining the mixed gas and oxygen flow for passage along reversed axially directed paths defined by said tubular members and the housing, and a second collection zone in said housing for the collection of oxidized particles separated during the reversed axial passage of the mixed gas and oxygen prior to discharge of the gas flow from said housing.

2. The apparatus claimed in claim 1 wherein said upright main member includes a lateral extension within which said perforate segment of said sleeve is housed.

3. The apparatus claimed in claim 2 wherein said lateral extension receives oxidized particles and partially defines said first collection zone.

4. The apparatus claimed in claim 1 wherein said housing includes an end plate partially defining said second collection zone.

5. The apparatus claimed in claim 1 wherein said housing and one of said tubular members define an annular area, metallic fibers in said annular area to render hazardous gas therein inert.

6. The apparatus claimed in claim 1 wherein said sleeve defines an elongate open area through which oxidized particles may gravitate into said first collection zone.

7. An apparatus for oxidizing and removing matter from a flow of hazardous gas and comprising, a housing having an upright main member, a hazardous gas conduit having a discharge end segment in communication with said housing, a sleeve in place about a portion of said conduit and said discharge end segment thereof and including a perforate segment extending into the housing and into which hazardous gas is discharged, means for discharging an air flow into said sleeve for mixing with the hazardous gas in a reaction zone within said perforate segment, a first collection zone in said housing for reception of oxidized particles from said perforate segment of said sleeve, tubular members radially spaced from one another in said housing and constraining the mixed gas and oxygen flow for passage along reversed axially directed paths defined by said tubular members and the housing, and a second collection zone in said housing for the collection of oxidized particles separated during the reversed axial passage of the mixed gas and oxygen prior to discharge of the gas flow from said housing.

8. The apparatus claimed in claim 7 wherein said means for discharging an air flow into said sleeve includes a source of pressurized air and conduit means in communication with said sleeve.

9. The apparatus claimed in claim 8 additionally including a diffuser plate interposed between said conduit means and said sleeve.

10. The apparatus claimed in claim 7 wherein said housing has a lateral extension of cylindrical configuration, said sleeve having a lengthwise axis laterally offset from the lengthwise axis of said sleeve providing said first collection zone below said sleeve of greater volume than if the lateral extension of the housing and sleeve were concentric.

* * * * *